(12) United States Patent
Kubouchi et al.

(10) Patent No.: US 10,020,756 B2
(45) Date of Patent: Jul. 10, 2018

(54) BOOST CHOPPER CIRCUIT

(71) Applicant: FUJI ELECTRIC CO., LTD., Kawasaki-shi, Kanagawa (JP)

(72) Inventors: Motoyoshi Kubouchi, Matsumoto (JP); Hao Hou, Kobe (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/468,317

(22) Filed: Mar. 24, 2017

(65) Prior Publication Data

US 2017/0331394 A1 Nov. 16, 2017

(30) Foreign Application Priority Data

May 12, 2016 (JP) ................. 2016-096292

(51) Int. Cl.
| | | |
|---|---|---|
| G05F 1/575 | (2006.01) | |
| H02M 7/537 | (2006.01) | |
| H02M 1/32 | (2007.01) | |
| H02P 27/06 | (2006.01) | |
| H02M 3/156 | (2006.01) | |
| H02M 3/158 | (2006.01) | |

(52) U.S. Cl.
CPC ............ *H02M 7/537* (2013.01); *H02M 1/32* (2013.01); *H02M 3/156* (2013.01); *H02P 27/06* (2013.01); *H02M 3/158* (2013.01)

(58) Field of Classification Search
CPC ...... H02M 1/32; H02M 5/458; H02M 7/4807; H02M 3/335; H02M 7/487; H02M 7/538; H02M 3/158; Y02B 70/1491

USPC ..... 363/16–17, 21.12, 21.15, 79, 89, 95, 97; 323/222, 225, 235, 271, 272
See application file for complete search history.

(56) References Cited

U.S. PATENT DOCUMENTS

| | | | | | |
|---|---|---|---|---|---|
| 3,637,974 | A | * | 1/1972 | Tajbl ................. | H05H 1/36 219/130.4 |
| 6,311,137 | B1 | * | 10/2001 | Kurokami ............. | H02J 3/383 363/74 |
| 7,292,462 | B2 | * | 11/2007 | Watanabe ............. | H02M 3/07 307/110 |
| 7,355,869 | B2 | * | 4/2008 | Okamura .......... | H02M 7/53873 318/434 |
| 7,965,069 | B2 | * | 6/2011 | Watanabe ............ | H02M 3/158 323/271 |
| 8,625,307 | B2 | * | 1/2014 | Iwata ............... | H02M 7/49 363/17 |
| 8,902,622 | B2 | * | 12/2014 | Suzuki ............... | H02M 7/003 363/127 |

FOREIGN PATENT DOCUMENTS

JP 2015-035890 A 2/2015

* cited by examiner

*Primary Examiner* — Rajnikant Patel
(74) *Attorney, Agent, or Firm* — Manabu Kanesaka (57) ABSTRACT

In a boost chopper circuit, a backflow prevention diode circuit has a withstand voltage equal to or more than a withstand voltage of a capacitor circuit connected in series to the backflow prevention diode circuit between opposite ends of a switching device circuit.

7 Claims, 2 Drawing Sheets

FIG.1

FIRST EMBODIMENT

FIG.2

SECOND EMBODIMENT

FIG.3
THIRD EMBODIMENT

FIG.4
FOURTH EMBODIMENT

BOOST CHOPPER CIRCUIT

CROSS-REFERENCE TO RELATED APPLICATION

The priority application number JP2016-096292, Boost Chopper Circuit, May 12, 2016, Motoyoshi Kubouchi and Hao Hou, upon which this patent application is based, is hereby incorporated by reference.

BACKGROUND OF THE INVENTION

Field of the Invention

The present invention relates to a boost chopper circuit, and more particularly, it relates to a boost chopper circuit including a diode and a capacitor.

Description of the Background Art

A boost chopper circuit including a diode and a capacitor is known in general, as disclosed in Japanese Patent Laying-Open No. 2015-035890.

In Japanese Patent Laying-Open No. 2015-035890, a reactor and a switching device (semiconductor device) are connected in series to a direct-current output circuit (electric car line). Furthermore, a series circuit of a backflow prevention diode (diode) and a capacitor (smoothing capacitor) is connected to opposite ends of the switching device. This boost chopper circuit is configured to boost an input voltage by controlling turning on and turning off of the switching device.

In the boost chopper circuit described in Japanese Patent Laying-Open No. 2015-035890, when the switching device (semiconductor device) is turned off, a series resonant current flows through the direct-current output circuit (electric car line), a reactor, and a capacitor (smoothing capacitor), and a voltage higher than that during normal operation may be applied to the capacitor. In this process, when the switching device has a short-circuit fault, a voltage applied to the capacitor is disadvantageously applied to the backflow prevention diode such that the backflow prevention diode fails.

SUMMARY OF THE INVENTION

The present invention has been proposed in order to solve the aforementioned problem, and an object of the present invention is to provide a boost chopper circuit that significantly reduces or prevents the failure of a backflow prevention diode.

A boost chopper circuit according to an aspect of the present invention includes a reactor, a switching device circuit connected to opposite ends of a direct-current output circuit through the reactor, a backflow prevention diode circuit connected in series to the switching device circuit, and a capacitor circuit connected in series to the backflow prevention diode circuit between opposite ends of the switching device circuit, and the backflow prevention diode circuit has a withstand voltage equal to or more than a withstand voltage of the capacitor circuit.

In the boost chopper circuit according to this aspect of the present invention, as hereinabove described, the withstand voltage of the backflow prevention diode circuit is equal to or more than the withstand voltage of the capacitor circuit, whereby even if a voltage substantially equal to a voltage applied to the capacitor circuit is applied to the backflow prevention diode circuit when the switching device circuit has a short-circuit fault, for example, the failure of the backflow prevention diode circuit can be significantly reduced or prevented. Consequently, the short circuit discharge of the capacitor circuit can be significantly reduced or prevented.

In the aforementioned boost chopper circuit according to this aspect, the backflow prevention diode circuit preferably includes a backflow prevention diode constructed of a wide band gap semiconductor. In general, the withstand voltage of the wide band gap semiconductor can be rendered higher than the withstand voltage of a semiconductor other than the wide band gap semiconductor. Therefore, the backflow prevention diode circuit is constructed of the wide band gap semiconductor, whereby the failure of the backflow prevention diode circuit can be relatively easily and significantly reduced or prevented as compared with the case where the backflow prevention diode circuit is constructed of the semiconductor other than the wide band gap semiconductor.

In the aforementioned boost chopper circuit according to this aspect, the switching device circuit preferably includes a first switching device and a second switching device connected in series to the first switching device, the backflow prevention diode circuit preferably includes a first backflow prevention diode connected in series to the first switching device and a second backflow prevention diode connected in series to the second switching device, the capacitor circuit preferably includes a first capacitor connected in series to the first backflow prevention diode and a second capacitor connected in series to the second backflow prevention diode between the opposite ends of the switching device circuit, a first connection that connects the first switching device to the second switching device and a second connection that connects the first capacitor to the second capacitor are preferably connected to each other, and the first backflow prevention diode preferably has a withstand voltage equal to or more than a withstand voltage of the first capacitor while the second backflow prevention diode preferably has a withstand voltage equal to or more than a withstand voltage of the second capacitor. According to this structure, when a voltage substantially equal to the voltage of the first capacitor is applied to the first backflow prevention diode, the failure of the first backflow prevention diode can be significantly reduced or prevented. When a voltage substantially equal to the voltage of the second capacitor is applied to the second backflow prevention diode, the failure of the second backflow prevention diode can be significantly reduced or prevented.

In this case, each of the first backflow prevention diode and the second backflow prevention diode is preferably constructed of a wide band gap semiconductor. According to this structure, the failure of each of the first backflow prevention diode and the second backflow prevention diode can be relatively easily and significantly reduced or prevented as compared with the case where each of the first backflow prevention diode and the second backflow prevention diode is constructed of a semiconductor other than the wide band gap semiconductor.

The aforementioned boost chopper circuit according to this aspect preferably further includes a parallel switching device circuit connected in parallel to the backflow prevention diode circuit, and the backflow prevention diode circuit and the parallel switching device circuit each preferably have a withstand voltage equal to or more than the withstand voltage of the capacitor circuit. According to this structure, the withstand voltage of each of the backflow prevention diode circuit and the parallel switching device circuit is equal to or more than the withstand voltage of the capacitor circuit, whereby even if a voltage substantially equal to the voltage of the capacitor circuit is applied to the backflow prevention diode circuit and the parallel switching device circuit when the switching device circuit has a short-circuit fault, for example, the failure of the backflow prevention diode circuit or the parallel switching device circuit can be significantly reduced or prevented.

In this case, the switching device circuit preferably includes a first switching device and a second switching device connected in series to the first switching device, the backflow prevention diode circuit preferably includes a first backflow prevention diode connected in series to the first switching device and a second backflow prevention diode connected in series to the second switching device, the capacitor circuit preferably includes a first capacitor connected in series to the first backflow prevention diode and a second capacitor connected in series to the second backflow prevention diode between the opposite ends of the switching device circuit, a first connection that connects the first switching device to the second switching device and a second connection that connects the first capacitor to the second capacitor are preferably connected to each other, the parallel switching device circuit preferably includes a first parallel switching device connected in parallel to the first backflow prevention diode and a second parallel switching device connected in parallel to the second backflow prevention diode, and the first backflow prevention diode and the first parallel switching device each preferably have a withstand voltage equal to or more than a withstand voltage of the first capacitor while the second backflow prevention diode and the second parallel switching device each preferably have a withstand voltage equal to or more than a withstand voltage of the second capacitor. According to this structure, the withstand voltage of each of the first backflow prevention diode and the first parallel switching device is equal to or more than the withstand voltage of the first capacitor, whereby even if a voltage substantially equal to the voltage of the first capacitor is applied to the first backflow prevention diode and the first parallel switching device when the first switching device has a short-circuit fault, for example, the failure of the first backflow prevention diode or the first parallel switching device can be significantly reduced or prevented. Furthermore, the withstand voltage of each of the second backflow prevention diode and the second parallel switching device is equal to or more than the withstand voltage of the second capacitor, whereby even if a voltage substantially equal to the voltage of the second capacitor is applied to the second backflow prevention diode and the second parallel switching device when the second switching device has a short-circuit fault, for example, the failure of the second backflow prevention diode or the second parallel switching device can be significantly reduced or prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of a boost chopper circuit 100 according to a first embodiment of the present invention is now described with reference to FIG. 1.

(Structure of Boost Chopper Circuit)

Figure 1:
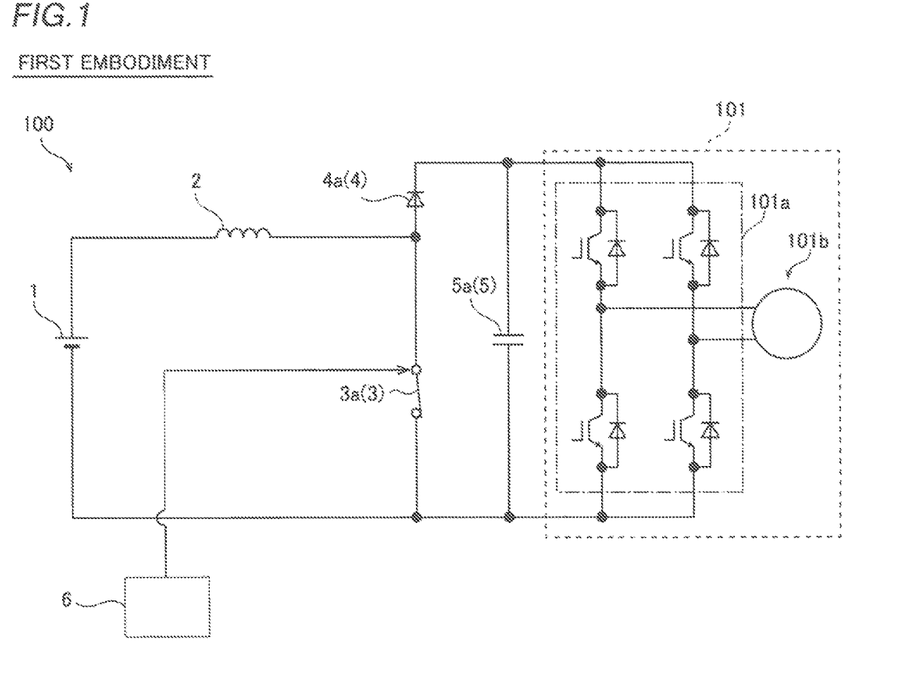
FIG. 1 is a diagram showing the circuit structure of a two-level boost chopper circuit according to a first embodiment of the present invention.

As shown in FIG. 1, the boost chopper circuit 100 is configured to boost a voltage output from a direct-current output circuit 1 and supply the boosted voltage to a loading device 101. According to the first embodiment, the boost chopper circuit 100 is configured as a so-called two-level boost chopper circuit. The direct-current output circuit 1 is configured as a direct-current power supply, or includes an alternating-current power supply and a rectifier circuit and is configured to be capable of outputting a direct current having a rectification waveform obtained by rectifying an alternate current.

The boost chopper circuit 100 includes a reactor 2, a switching device circuit 3, a backflow prevention diode circuit 4, a capacitor circuit 5, and a control circuit 6. In general, the term "circuit" indicates a system of conductors connected to each other without an end, but in this description, the term "circuit" indicates a wider concept including the case where a "path of a current" has an end.

According to the first embodiment, the switching device circuit 3 is connected to opposite ends of the direct-current output circuit 1 through the reactor 2. The backflow prevention diode circuit 4 is connected in series to the switching device circuit 3. The capacitor circuit 5 is connected in series to the backflow prevention diode circuit 4 between opposite ends of the switching device circuit 3. Specifically, the switching device circuit 3 includes a switching device 3a. The backflow prevention diode circuit 4 includes a backflow prevention diode 4a. The capacitor circuit 5 includes a capacitor 5a. A first end of the reactor 2 is connected to a positive pole of the direct-current output circuit 1, and a second end of the reactor 2 is connected to a first end of the switching device 3a and an anode of the backflow prevention diode 4a. A cathode of the backflow prevention diode 4a is connected to a positive potential side of the capacitor 5a. A second end of the switching device 3a and a negative potential side of the capacitor 5a are connected to a negative pole of the direct-current output circuit 1.

The withstand voltage of the backflow prevention diode circuit 4 is equal to or more than the withstand voltage of the capacitor circuit 5. Specifically, the backflow prevention diode circuit 4 has a withstand voltage equal to or more than the withstand voltage of the capacitor circuit 5. More specifically, the backflow prevention diode 4a has a withstand voltage equal to or more than the withstand voltage of the capacitor 5a.

According to the first embodiment, the backflow prevention diode circuit 4 includes a backflow prevention diode constructed of a wide band gap semiconductor. Specifically, the backflow prevention diode 4a is constructed of a semiconductor, the band gap of which is wider than that of a silicon semiconductor such as SiC, GaN, diamond, AlN, or ZnO.

The switching device 3a is configured as a switching device such as a MOSFET, an IGBT (insulated gate bipolar transistor), or a transistor. The switching device 3a is constructed of a semiconductor (silicon, for example) other than a wide band gap semiconductor.

The withstand voltage of the backflow prevention diode circuit 4 has a withstand voltage equal to or more than the withstand voltage of the switching device circuit 3. Specifically, the backflow prevention diode 4a has a withstand voltage equal to or more than the withstand voltage of the switching device 3a. The switching device 3a has a withstand voltage lower than the withstand voltage of the capacitor 5a.

The control circuit 6 is connected to the switching device 3a, and controls turning on and turning off (switching operation) of the switching device 3a. The control circuit 6 can adjust (control) a voltage value and a current value (the current value of a current that flows through the reactor 2) with respect to the loading device 101 of the boost chopper circuit 100 by controlling the turning on and turning off of the switching device 3a.

The loading device 101 includes an inverter 101a including a plurality of switching devices and an electric motor 101b, for example. The inverter 101a is connected to opposite ends of the capacitor circuit 5, and is configured to convert direct-current power with a voltage boosted by the boost chopper circuit 100 to alternating-current power and supply the alternating-current power to the electric motor 101b. The electric motor 101b is configured as a rotating electrical machine, for example, and is configured to consume the alternating-current power from the inverter 101a to be rotationally driven.

(Operation of Boost Chopper Circuit)

The operation of the boost chopper circuit 100 according to the first embodiment is now described with reference to FIG. 1. The operation of the boost chopper circuit 100 is performed by control processing of the control circuit 6.

When the switching device 3a is turned off, a series resonant circuit of the direct-current output circuit 1, the reactor 2, and the capacitor 5a is formed, and the voltage of the capacitor 5a rises. In this case, the voltage of the capacitor 5a is applied to the switching device 3a. The backflow prevention diode 4a conducts, and no voltage is applied thereto.

When the switching device 3a is turned on, the direct-current output circuit 1 is short-circuited through the reactor 2, and no current flows into the capacitor 5a. In this case, the voltage of the capacitor 5a is applied to the backflow prevention diode 4a. A current flows from the capacitor 5a to the subsequent loading device 101 so that the voltage of the capacitor 5a drops.

During steady operation, the switching device 3a is switched on and off at a fixed time ratio, the amount of rise in the voltage of the capacitor 5a in the case where the switching device 3a is switched off balances the amount of drop in the voltage of the capacitor 5a in the case where the switching device 3a is switched on, and the voltage of the capacitor 5a becomes a substantially constant and boosted direct-current voltage that is equal to or more than an input power supply voltage.

When the device (loading device 101) stops, the switching device 3a is turned off. Furthermore, the switches of the inverter 101a in the loading device 101 are turned off, and no current flows to the loading device 101. In this case, the direct-current output circuit 1, the reactor 2, and the capacitor 5a form a series resonant circuit, and hence a voltage applied to the capacitor 5a becomes higher than that during normal operation. In this case, the withstand voltage of the capacitor 5a becomes higher than the voltage applied to the capacitor 5a.

When a resonant current reaches zero, the discharge of the capacitor 5a is prevented by the backflow prevention diode 4a and the switching device 3a, which is off. Whereas the voltage of the switching device 3a is equal to the voltage of the capacitor 5a during the time when the capacitor 5a is charged, the voltage of the switching device 3a becomes equal to the voltage of the direct-current output circuit 1 when the resonant current reaches zero. Whereas the voltage of the backflow prevention diode 4a is relatively low during the time when the capacitor 5a is charged, a voltage obtained by subtracting the voltage of the switching device 3a (the voltage of the direct-current output circuit 1) from the voltage of the capacitor 5a is applied to the backflow prevention diode 4a when the resonant current reaches zero.

In the boost chopper circuit 100 that performs the above operation, the switching device 3a can have a short-circuit fault when an abnormal control signal is input from the control circuit 6 or a voltage that exceeds the withstand voltage is applied to the switching device 3a. In this case, the voltage of the capacitor 5a is not applied to the switching device 3a, but is applied to the backflow prevention diode 4a.

Effects of First Embodiment

According to the first embodiment, the following effects can be obtained.

According to the first embodiment, as hereinabove described, the boost chopper circuit 100 includes the reactor 2, the switching device circuit 3 connected to the opposite ends of the direct-current output circuit 1 through the reactor 2, the backflow prevention diode circuit 4 connected in series to the switching device circuit 3, and the capacitor circuit 5 connected in series to the backflow prevention diode circuit 4 between the opposite ends of the switching device circuit 3, and the withstand voltage of the backflow prevention diode circuit 4 is equal to or more than the withstand voltage of the capacitor circuit 5. Thus, the withstand voltage of the backflow prevention diode circuit 4 is equal to or more than the withstand voltage of the capacitor circuit 5, whereby even if a voltage substantially equal to the voltage of the capacitor circuit 5 is applied to the backflow prevention diode circuit 4 when the switching device circuit 3 has a short-circuit fault, for example, the failure of the backflow prevention diode circuit 4 can be significantly reduced or prevented. Consequently, the short circuit discharge of the capacitor circuit 5 can be significantly reduced or prevented.

According to the first embodiment, as hereinabove described, the backflow prevention diode circuit 4 has the withstand voltage equal to or more than the withstand voltage of the capacitor circuit 5. Thus, when a voltage substantially equal to the voltage of the capacitor circuit 5 is applied to the backflow prevention diode circuit 4, the failure of the backflow prevention diode circuit 4 can be more reliably and significantly reduced or prevented.

According to the first embodiment, as hereinabove described, the backflow prevention diode circuit 4 includes the backflow prevention diode constructed of the wide band gap semiconductor. In general, the withstand voltage of the wide band gap semiconductor can be rendered higher than the withstand voltage of a semiconductor other than the wide band gap semiconductor. Therefore, the backflow prevention diode circuit 4 is constructed of the wide band gap semiconductor, whereby the failure of the backflow prevention diode circuit 4 can be relatively easily and significantly reduced or prevented as compared with the case where the backflow prevention diode circuit 4 is constructed of the semiconductor other than the wide band gap semiconductor.

According to the first embodiment, as hereinabove described, the backflow prevention diode circuit 4 has the withstand voltage equal to or more than the withstand voltage of the switching device circuit 3. Thus, when the switching device circuit 3 has a short-circuit fault such that the voltage of the capacitor circuit 5 is applied to the backflow prevention diode circuit 4, the failure of the backflow prevention diode circuit 4 can be significantly reduced or prevented.

Second Embodiment

The structure of a boost chopper circuit 200 according to a second embodiment is now described with reference to FIG. 2. According to the second embodiment, the boost chopper circuit 200 is configured as a three-level boost chopper circuit unlike the first embodiment. Portions of the boost chopper circuit 200 similar to those of the boost chopper circuit 100 according to the aforementioned first embodiment are denoted by the same reference numerals, to omit the description.

(Structure of Boost Chopper Circuit)

Figure 2:
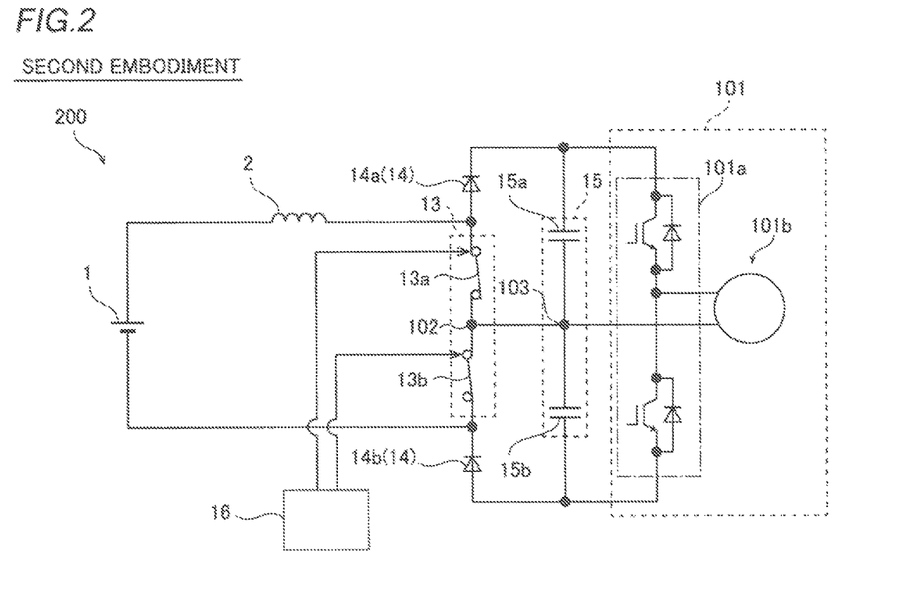
FIG. 2 is a diagram showing the circuit structure of a three-level boost chopper circuit according to a second embodiment of the present invention.

According to the second embodiment, the boost chopper circuit 200 is configured as a so-called three-level boost chopper circuit, as shown in FIG. 2.

A switching device circuit 13 includes a first switching device 13a and a second switching device 13b connected in series to the first switching device 13a. A backflow prevention diode circuit 14 includes a first backflow prevention diode 14a connected in series to the first switching device 13a and a second backflow prevention diode 14b connected in series to the second switching device 13b. A capacitor circuit 15 includes a first capacitor 15a connected in series to the first backflow prevention diode 14a and a second capacitor 15b connected in series to the second backflow prevention diode 14b between opposite ends of the switching device circuit 13. A first connection 102 that connects the first switching device 13a to the second switching device 13b and a second connection 103 that connects the first capacitor 15a to the second capacitor 15b are connected to each other.

Specifically, a second end of the first switching device 13a opposite to a first end of the first switching device 13a connected to the second switching device 13b and an anode of the first backflow prevention diode 14a are connected to each other. Each of the second end of the first switching device 13a opposite to the first end of the first switching device 13a connected to the second switching device 13b and the anode of the first backflow prevention diode 14a is connected to a second end of a reactor 2 opposite to a first end of the reactor 2 connected to a positive pole of a direct-current output circuit 1. A second end of the second switching device 13b opposite to a first end of the second switching device 13b connected to the first switching device 13a and a cathode of the second backflow prevention diode 14b are connected to each other. Each of the second end of the second switching device 13b opposite to the first end of the second switching device 13b connected to the first switching device 13a and the cathode of the second backflow prevention diode 14b is connected to a negative pole of the direct-current output circuit 1.

According to the second embodiment, the first backflow prevention diode 14a has a withstand voltage equal to or more than the withstand voltage of the first capacitor 15a. The second backflow prevention diode 14b has a withstand voltage equal to or more than the withstand voltage of the second capacitor 15b. The first backflow prevention diode 14a has a withstand voltage equal to or more than the withstand voltage of the first switching device 13a. The second backflow prevention diode 14b has a withstand voltage equal to or more than the withstand voltage of the second switching device 13b. The withstand voltage of the first switching device 13a is lower than the withstand voltage of the first capacitor 15a. The withstand voltage of the second switching device 13b is lower than the withstand voltage of the second capacitor 15b.

According to the second embodiment, each of the first backflow prevention diode 14a and the second backflow prevention diode 14b is constructed of a wide band gap semiconductor. Each of the first switching device 13a and the second switching device 13b is constructed of a semiconductor (silicon, for example) other than a wide band gap semiconductor.

A control circuit 16 is connected to the first switching device 13a and the second switching device 13b, and controls a time ratio of turning on and turning off (switching operation) of each of the first switching device 13a and the second switching device 13b. The control circuit 16 can adjust (control) a voltage value and a current value (the current value of a current that flows through the reactor 2) with respect to a loading device 101 of the boost chopper circuit 200 by controlling the time ratio of turning on and turning off of each of the first switching device 13a and the second switching device 13b.

(Operation of Boost Chopper Circuit)

The operation of the boost chopper circuit 200 according to the second embodiment is now described with reference to FIG. 2. The operation of the boost chopper circuit 200 is performed by control processing of the control circuit 16.

When the first switching device 13a is turned on and the second switching device 13b is turned off, a series resonant circuit of the direct-current output circuit 1, the reactor 2, and the second capacitor 15b is formed, and the voltage of the second capacitor 15b rises. In this case, the voltage of the second capacitor 15b is applied to the second switching device 13b. The second backflow prevention diode 14b conducts, and no voltage is applied thereto. The voltage of the first capacitor 15a into which no current flows from the direct-current output circuit 1 is applied to the first backflow prevention diode 14a.

When the first switching device 13a is turned off and the second switching device 13b is turned on, the direct-current output circuit 1 charges the first capacitor 15a, and the voltage of the first capacitor 15a is applied to the first switching device 13a, which is off.

When both the first switching device 13a and the second switching device 13b are turned on, the direct-current output circuit 1 is short-circuited through the reactor 2, and no current flows from the direct-current output circuit 1 into the first capacitor 15a and the second capacitor 15b. The voltages of the first capacitor 15a and the second capacitor 15b are applied to the first backflow prevention diode 14a and the second backflow prevention diode 14b, respectively. A current flows from the first capacitor 15a and the second capacitor 15b to the subsequent loading device 101 (in FIG. 2, the loading device 101 is illustrated as a half-bridge single-phase inverter, but it is not restricted to this) so that the voltages of the first capacitor 15a and the second capacitor 15b drop.

When both the first switching device 13a and the second switching device 13b are turned off, the first capacitor 15a and the second capacitor 15b are charged by current from the direct-current output circuit 1. The voltage of the first capacitor 15a is applied to the first switching device 13a, and the voltage of the second capacitor 15b is applied to the second switching device 13b.

During steady operation, each of the first switching device 13a and the second switching device 13b is switched on and off at a fixed time ratio, the amount of rise in the voltages of the first capacitor 15a and the second capacitor 15b in the case where the first switching device 13a and the second switching device 13b are switched off balances the amount of drop in the voltages of the first capacitor 15a and the second capacitor 15b in the case where the first switching device 13a and the second switching device 13b are switched on, and a substantially constant direct-current voltage is obtained.

When the device (loading device 101) stops, both the first switching device 13a and the second switching device 13b are turned off. Furthermore, the subsequent loading device 101 (switches of the inverter) is also turned off, and no current flows to the loading device 101. In this case, the direct-current output circuit 1, the reactor 2, the first capacitor 15a, and the second capacitor 15b form a series resonant circuit, and the voltages of the first capacitor 15a and the second capacitor 15b rise. Both the first switching device 13a and the second switching device 13b are not turned on (in an off-state), and hence the voltages of the first capacitor 15a and the second capacitor 15b are raised above those during steady operation. In this case, the withstand voltages of the first capacitor 15a and the second capacitor 15b are higher than the raised voltages.

When a resonant current reaches zero, the discharge of the first capacitor 15a and the second capacitor 15b is prevented by the first backflow prevention diode 14a, the second backflow prevention diode 14b, and the first switching device 13a and the second switching device 13b, which are off. Whereas the voltages of the first switching device 13a and the second switching device 13b are equal to the voltage of the first capacitor 15a or the second capacitor 15b during the time when the capacitor circuit 15 is charged, the voltages of the first switching device 13a and the second switching device 13b become equal to a half of the voltage of the direct-current output circuit 1 when the resonant current reaches zero. Although the first backflow prevention diode 14a and the second backflow prevention diode 14b have no voltage during the time when the first capacitor 15a and the second capacitor 15b are charged (the potential difference is substantially zero), a voltage obtained by subtracting the voltages of the first switching device 13a and the second switching device 13b (a half of the voltage of the direct-current output circuit 1) from the voltages of the first capacitor 15a and the second capacitor 15b is applied to the first backflow prevention diode 14a and the second backflow prevention diode 14b when the resonant current reaches zero.

In the boost chopper circuit 200 that performs the above operation, one (first switching device 13a, for example) of the first switching device 13a and the second switching device 13b can have a short-circuit fault when an abnormal control signal is input from the control circuit 16 or a voltage that exceeds the withstand voltage is applied thereto. In this case, although the voltage of the first capacitor 15a is applied to the first backflow prevention diode 14a, the withstand voltage of the first backflow prevention diode 14a is higher than the voltage of the first capacitor 15a, and hence the first backflow prevention diode 14a does not fail, and the short circuit discharge of the first capacitor 15a is prevented. Furthermore, in this case, an inverter 101a is disconnected such that the loading device 101 is separate from the boost chopper circuit 200, and the second switching device 13b is controlled to be disconnected. The first switching device 13a has a short-circuit fault, whereby a series resonant current flows from the direct-current output circuit 1 to the second capacitor 15b through the reactor 2 and the short-circuited first switching device 13a, and the voltage of the second capacitor 15b rises. Thus, the voltage of the second capacitor 15b becomes higher than a voltage applied to the second capacitor 15b when both the first switching device 13a and the second switching device 13b are turned off. The withstand voltage of the second capacitor 15b is higher than the voltage of the second capacitor 15b that rises at this time. The withstand voltage of the first capacitor 15a is higher than the voltage of the first capacitor 15a that rises when the second switching device 13b has a short-circuit fault.

When a resonant current reaches zero, the discharge of the second capacitor 15b is prevented by the second backflow prevention diode 14b and the second switching device 13b, which is off. Whereas the voltage of the second switching device 13b is equal to the voltage of the second capacitor 15b during the time when the second capacitor 15b is charged, the voltage of the second switching device 13b becomes equal to the voltage of the direct-current output circuit 1 when the resonant current reaches zero. Although the second backflow prevention diode 14b has no voltage during the time when the second capacitor 15b is charged (the potential difference is substantially zero), a voltage obtained by subtracting the voltage of the second switching device 13b (the voltage of the direct-current output circuit 1) from the voltage of the second capacitor 15b is applied to the second backflow prevention diode 14b when the resonant current reaches zero.

The remaining structures of the boost chopper circuit 200 according to the second embodiment are similar to those of the boost chopper circuit 100 according to the aforementioned first embodiment.

Effects of Second Embodiment

According to the second embodiment, the following effects can be obtained.

According to the second embodiment, as hereinabove described, the switching device circuit 13 includes the first switching device 13a and the second switching device 13b connected in series to the first switching device 13a, the backflow prevention diode circuit 14 includes the first backflow prevention diode 14a connected in series to the first switching device 13a and the second backflow prevention diode 14b connected in series to the second switching device 13b, the capacitor circuit 15 includes the first capacitor 15a connected in series to the first backflow prevention diode 14a and the second capacitor 15b connected in series to the second backflow prevention diode 14b between the opposite ends of the switching device circuit 13, the first connection 102 that connects the first switching device 13a to the second switching device 13b and the second connection 103 that connects the first capacitor 15a to the second capacitor 15b are connected to each other, and the first backflow prevention diode 14a has the withstand voltage equal to or more than the withstand voltage of the first capacitor 15a while the second backflow prevention diode 14b has the withstand voltage equal to or more than the withstand voltage of the second capacitor 15b. Thus, when a voltage substantially equal to the voltage of the first capacitor 15a is applied to the first backflow prevention diode 14a, the failure of the first backflow prevention diode 14a can be significantly reduced or prevented. When a voltage substantially equal to the voltage of the second capacitor 15b is applied to the second backflow prevention diode 14b, the failure of the second backflow prevention diode 14b can be significantly reduced or prevented.

According to the second embodiment, as hereinabove described, each of the first backflow prevention diode 14a and the second backflow prevention diode 14b is constructed of the wide band gap semiconductor. Thus, the failure of each of the first backflow prevention diode 14a and the second backflow prevention diode 14b can be relatively easily and significantly reduced or prevented as compared with the case where each of the first backflow prevention diode 14a and the second backflow prevention diode 14b is constructed of a semiconductor other than the wide band gap semiconductor.

According to the second embodiment, as hereinabove described, the first backflow prevention diode 14a has the withstand voltage equal to or more than the withstand voltage of the first switching device 13a while the second backflow prevention diode 14b has the withstand voltage equal to or more than the withstand voltage of the second switching device 13b. Thus, when the first switching device 13a has a short-circuit fault such that the voltage of the first capacitor 15a is applied to the first backflow prevention diode 14a, the failure of the first backflow prevention diode 14a can be significantly reduced or prevented. When the second switching device 13b has a short-circuit fault such that the voltage of the second capacitor 15b is applied to the second backflow prevention diode 14b, the failure of the second backflow prevention diode 14b can be significantly reduced or prevented.

The remaining effects of the boost chopper circuit 200 according to the second embodiment are similar to those of the boost chopper circuit 100 according to the aforementioned first embodiment.

Third Embodiment

Figure 3:
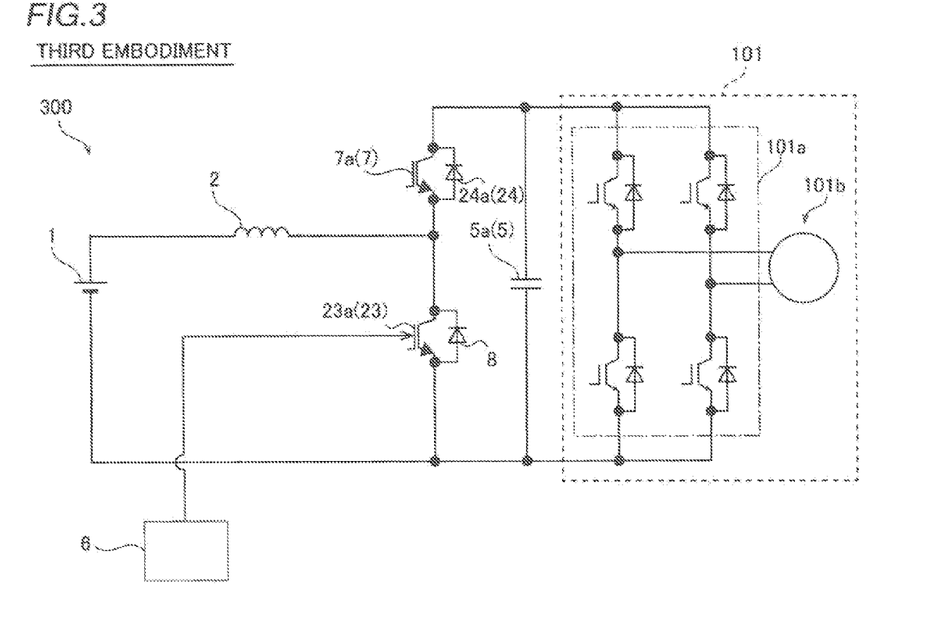
FIG. 3 is a diagram showing the circuit structure of a two-level boost chopper circuit according to a third embodiment of the present invention.

The structure of a boost chopper circuit 300 according to a third embodiment is now described with reference to FIG. 3. According to the third embodiment, the boost chopper circuit 300 is configured as a two-level boost chopper circuit similarly to the first embodiment. On the other hand, the boost chopper circuit 300 includes a switching device connected in parallel to a backflow prevention diode circuit 24. Portions of the boost chopper circuit 300 similar to those of the boost chopper circuit 100 according to the aforementioned first embodiment are denoted by the same reference numerals, to omit the description.

(Structure of Boost Chopper Circuit)

According to the third embodiment, the boost chopper circuit 300 includes a parallel switching device circuit 7 connected in parallel to the backflow prevention diode circuit 24. The backflow prevention diode circuit 24 and the parallel switching device circuit 7 each has a withstand voltage equal to or more than the withstand voltage of a capacitor circuit 5. Specifically, the parallel switching device circuit 7 includes a parallel switching device 7a connected in parallel to a backflow prevention diode 24a of the backflow prevention diode circuit 24. The backflow prevention diode 24a and the parallel switching device 7a each have a withstand voltage equal to or more than the withstand voltage of a capacitor 5a.

The boost chopper circuit 300 includes an antiparallel diode 8 connected in anti-parallel to a switching device 23a of a switching device circuit 23. The backflow prevention diode 24a and the parallel switching device 7a constitute a single module. The switching device 23a and the antiparallel diode 8 constitute a single module.

The lower of the withstand voltage of the backflow prevention diode 24a and the withstand voltage of the parallel switching device 7a is higher than the lower of the withstand voltage of the switching device 23a and the withstand voltage of the antiparallel diode 8. Specifically, the withstand voltage of the parallel switching device 7a is higher than the withstand voltage of the backflow prevention diode 24a. The withstand voltage of the antiparallel diode 8 is higher than the withstand voltage of the switching device 23a. The withstand voltage of the backflow prevention diode 24a is lower than the withstand voltage of the antiparallel diode 8 but is higher than the withstand voltage of the switching device 23a. Each of the parallel switching device 7a and the antiparallel diode 8 is not involved in a switching operation.

The remaining structures of the boost chopper circuit 300 according to the third embodiment are similar to those of the boost chopper circuit 100 according to the aforementioned first embodiment.

Effects of Third Embodiment

According to the third embodiment, the following effects can be obtained.

According to the third embodiment, as hereinabove described, the boost chopper circuit 300 further includes the parallel switching device circuit 7 connected in parallel to the backflow prevention diode circuit 24, and the backflow prevention diode circuit 24 and the parallel switching device circuit 7 each have the withstand voltage equal to or more than the withstand voltage of the capacitor circuit 5. Thus, the withstand voltage of each of the backflow prevention diode circuit 24 and the parallel switching device circuit 7 is equal to or more than the withstand voltage of the capacitor circuit 5, whereby even if a voltage substantially equal to the voltage of the capacitor circuit 5 is applied to the backflow prevention diode circuit 24 and the parallel switching device circuit 7 when the switching device circuit 23 has a short-circuit fault, for example, the failure of the backflow prevention diode circuit 24 or the parallel switching device circuit 7 can be significantly reduced or prevented.

The remaining effects of the boost chopper circuit 300 according to the third embodiment are similar to those of the boost chopper circuit 100 according to the aforementioned first embodiment.

Fourth Embodiment

The structure of a boost chopper circuit 400 according to a fourth embodiment is now described with reference to FIG. 4. According to the fourth embodiment, the boost chopper circuit 400 is configured as a three-level boost chopper circuit similarly to the second embodiment. On the other hand, the boost chopper circuit 400 includes a switching device connected in parallel to a backflow prevention diode circuit 34. Portions of the boost chopper circuit 400 similar to those of the boost chopper circuit 200 according to the aforementioned second embodiment are denoted by the same reference numerals, to omit the description.

(Structure of Boost Chopper Circuit)

Figure 4:
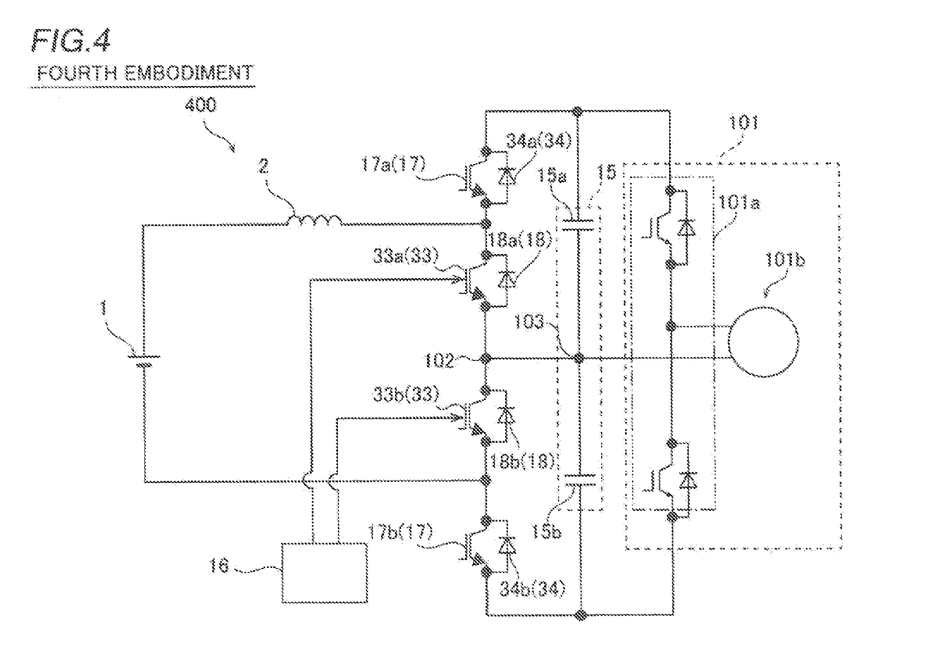
FIG. 4 is a diagram showing the circuit structure of a three-level boost chopper circuit according to a fourth embodiment of the present invention.

As shown in FIG. 4, a switching device circuit 33 includes a first switching device 33a and a second switching device 33b connected in series to the first switching device 33a. The backflow prevention diode circuit 34 includes a first backflow prevention diode 34a connected in series to the first switching device 33a and a second backflow prevention diode 34b connected in series to the second switching device 33b.

The boost chopper circuit 400 includes an antiparallel diode 18 connected in anti-parallel to the switching device circuit 33. Specifically, the antiparallel diode 18 includes a first antiparallel diode 18a, and the first antiparallel diode 18a is connected in anti-parallel to the first switching device 33a. The antiparallel diode 18 includes a second antiparallel diode 18b, and the second antiparallel diode 18b is connected in anti-parallel to the second switching device 33b. The first backflow prevention diode 34a and a first parallel switching device 17a described later constitute a single module. The first switching device 33a and the first antiparallel diode 18a constitute a single module. The second backflow prevention diode 34b and a second parallel switching device 17b described later constitute a single module. The second switching device 33b and the second antiparallel diode 18b constitute a single module.

According to the fourth embodiment, a parallel switching device circuit 17 includes the first parallel switching device 17a connected in parallel to the first backflow prevention diode 34a and the second parallel switching device 17b connected in parallel to the second backflow prevention diode 34b. The first backflow prevention diode 34a and the first parallel switching device 17a each have a withstand voltage equal to or more than the withstand voltage of a first capacitor 15a. The second backflow prevention diode 34b and the second parallel switching device 17b each have a withstand voltage equal to or more than the withstand voltage of a second capacitor 15b.

The lower of the withstand voltage of the first backflow prevention diode 34a and the withstand voltage of the first parallel switching device 17a is higher than the lower of the withstand voltage of the first switching device 33a and the withstand voltage of the first antiparallel diode 18a. Specifically, the withstand voltage of the first parallel switching device 17a is higher than the withstand voltage of the first backflow prevention diode 34a. The withstand voltage of the first antiparallel diode 18a is higher than the withstand voltage of the first switching device 33a. The withstand voltage of the first backflow prevention diode 34a is lower than the withstand voltage of the first antiparallel diode 18a but is higher than the withstand voltage of the first switching device 33a. Each of the first parallel switching device 17a and the first antiparallel diode 18a is not involved in a switching operation.

The lower of the withstand voltage of the second backflow prevention diode 34b and the withstand voltage of the second parallel switching device 17b is higher than the lower of the withstand voltage of the second switching device 33b and the withstand voltage of the second antiparallel diode 18b. Specifically, the withstand voltage of the second parallel switching device 17b is higher than the withstand voltage of the second backflow prevention diode 34b. The withstand voltage of the second antiparallel diode 18b is higher than the withstand voltage of the second switching device 33b. The withstand voltage of the second backflow prevention diode 34b is lower than the withstand voltage of the second antiparallel diode 18b but is higher than the withstand voltage of the second switching device 33b. Each of the second parallel switching device 17b and the second antiparallel diode 18b is not involved in a switching operation.

The remaining structures of the boost chopper circuit 400 according to the fourth embodiment are similar to those of the boost chopper circuit 200 according to the aforementioned second embodiment.

Effects of Fourth Embodiment

According to the fourth embodiment, the following effects can be obtained.

According to the fourth embodiment, as hereinabove described, the switching device circuit 33 includes the first switching device 33a and the second switching device 33b connected in series to the first switching device 33a, the backflow prevention diode circuit 34 includes the first backflow prevention diode 34a connected in series to the first switching device 33a and the second backflow prevention diode 34b connected in series to the second switching device 33b, a capacitor circuit 15 includes the first capacitor 15a connected in series to the first backflow prevention diode 34a and the second capacitor 15b connected in series to the second backflow prevention diode 34b between opposite ends of the switching device circuit 33, a first connection 102 that connects the first switching device 33a to the second switching device 33b and a second connection 103 that connects the first capacitor 15a to the second capacitor 15b are connected to each other, the parallel switching device circuit 17 includes the first parallel switching device 17a connected in parallel to the first backflow prevention diode 34a and the second parallel switching device 17b connected in parallel to the second backflow prevention diode 34b, and the first backflow prevention diode 34a and the first parallel switching device 17a each have the withstand voltage equal to or more than the withstand voltage of the first capacitor 15a while the second backflow prevention diode 34b and the second parallel switching device 17b each have the withstand voltage equal to or more than the withstand voltage of the second capacitor 15b.

Thus, the withstand voltage of each of the first backflow prevention diode 34a and the first parallel switching device 17a is equal to or more than the withstand voltage of the first capacitor 15a, whereby even if a voltage substantially equal to the voltage of the first capacitor 15a is applied to the first backflow prevention diode 34a and the first parallel switching device 17a when the first switching device 33a has a short-circuit fault, for example, the failure of the first backflow prevention diode 34a or the first parallel switching device 17a can be significantly reduced or prevented. Furthermore, the withstand voltage of each of the second backflow prevention diode 34b and the second parallel switching device 17b is equal to or more than the withstand voltage of the second capacitor 15b, whereby even if a voltage substantially equal to the voltage of the second capacitor 15b is applied to the second backflow prevention diode 34b and the second parallel switching device 17b when the second switching device 33b has a short-circuit fault, for example, the failure of the second backflow prevention diode 34b or the second parallel switching device 17b can be significantly reduced or prevented.

The remaining effects of the boost chopper circuit 400 according to the fourth embodiment are similar to those of the boost chopper circuit 200 according to the aforementioned second embodiment.

[Modification]

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the switching device(s) of the switching device circuit 3 (13, 23, 33) is constructed of the semiconductor other than the wide band gap semiconductor in each of the aforementioned first to fourth embodiments, the present invention is not restricted to this. For example, the switching device(s) of the switching device circuit 3 (13, 23, 33) may alternatively be constructed of the wide band gap semiconductor.

While the withstand voltage of the switching device circuit 3 (13, 23, 33) is lower than the withstand voltage of the capacitor circuit 5 (15) in each of the aforementioned first to fourth embodiments, the present invention is not restricted to this. For example, the withstand voltage of the switching device circuit 3 (13, 23, 33) may alternatively be higher than at least one of the withstand voltage of the capacitor circuit 5 (15) and the withstand voltage of the backflow prevention diode circuit 4 (14, 24, 34).

While the withstand voltage of the backflow prevention diode 24a is lower than the withstand voltage of the antiparallel diode 8 in the aforementioned third embodiment, the present invention is not restricted to this. For example, the withstand voltage of the backflow prevention diode 24a may alternatively be higher than the withstand voltage of the antiparallel diode 8.

While the withstand voltage of the first backflow prevention diode 34a is lower than the withstand voltage of the first antiparallel diode 18a and the withstand voltage of the second backflow prevention diode 34b is lower than the withstand voltage of the second antiparallel diode 18b in the aforementioned fourth embodiment, the present invention is not restricted to this. For example, the withstand voltage of the first backflow prevention diode 34a may alternatively be higher than the withstand voltage of the first antiparallel diode 18a, and the withstand voltage of the second backflow prevention diode 34b may alternatively be higher than the withstand voltage of the second antiparallel diode 18b.

While the withstand voltage of the parallel switching device 7a is higher than the withstand voltage of the backflow prevention diode 24a and the withstand voltage of the antiparallel diode 8 is higher than the withstand voltage of the switching device 23a in the aforementioned third embodiment, the present invention is not restricted to this. For example, the withstand voltage of the backflow prevention diode 24a may alternatively be higher than the withstand voltage of the parallel switching device 7a, and the withstand voltage of the switching device 23a may alternatively be higher than the withstand voltage of the antiparallel diode 8. In this case, the withstand voltage of the parallel switching device 7a is higher than at least one of the withstand voltage of the switching device 23a and the withstand voltage of the antiparallel diode 8.

While the withstand voltage of the first parallel switching device 17a is higher than the withstand voltage of the first backflow prevention diode 34a and the withstand voltage of the first antiparallel diode 18a is higher than the withstand voltage of the first switching device 33a in the aforementioned fourth embodiment, the present invention is not restricted to this. For example, the withstand voltage of the first backflow prevention diode 34a may alternatively be higher than the withstand voltage of the first parallel switching device 17a, and the withstand voltage of the first switching device 33a may alternatively be higher than the withstand voltage of the first antiparallel diode 18a. In this case, the withstand voltage of the first parallel switching device 17a is higher than at least one of the withstand voltage of the first switching device 33a and the withstand voltage of the first antiparallel diode 18a. Furthermore, while the withstand voltage of the second parallel switching device 17b is higher than the withstand voltage of the second backflow prevention diode 34b and the withstand voltage of the second antiparallel diode 18b is higher than the withstand voltage of the second switching device 33b in the aforementioned fourth embodiment, the present invention is not restricted to this. For example, the withstand voltage of the second backflow prevention diode 34b may alternatively be higher than the withstand voltage of the second parallel switching device 17b, and the withstand voltage of the second switching device 33b may alternatively be higher than the withstand voltage of the second antiparallel diode 18b. In this case, the withstand voltage of the second parallel switching device 17b is higher than at least one of the withstand voltage of the second switching device 33b and the withstand voltage of the second antiparallel diode 18b.

While the antiparallel diode 8 (18a, 18b) is connected in anti-parallel to the switching device 23a (33a, 33b) in the aforementioned third (fourth) embodiment, the present invention is not restricted to this. For example, a switching device other than a diode may alternatively be connected in parallel to the switching device 23a (33a, 33b).

While the boost chopper circuit 100 (200, 300, 400) is always conductive between the direct-current output circuit 1 and the reactor 2 in each of the aforementioned first to fourth embodiments, the present invention is not restricted to this. For example, a current breaking mechanism may alternatively be provided between the direct-current output circuit 1 and the reactor 2.

What is claimed is:

1. A boost chopper circuit comprising:
    a reactor;
    a switching device circuit connected to opposite ends of a direct-current output circuit through the reactor;
    a backflow prevention diode circuit connected in series to the switching device circuit; and
    a capacitor circuit connected in series to the backflow prevention diode circuit between opposite ends of the switching device circuit, wherein
    the backflow prevention diode circuit has a withstand voltage equal to or more than a withstand voltage of the capacitor circuit.

2. The boost chopper circuit according to claim 1, wherein the backflow prevention diode circuit includes a backflow prevention diode constructed of a wide band gap semiconductor.

3. The boost chopper circuit according to claim 1, wherein the switching device circuit includes a first switching device and a second switching device connected in series to the first switching device,
    the backflow prevention diode circuit includes a first backflow prevention diode connected in series to the first switching device and a second backflow prevention diode connected in series to the second switching device, the capacitor circuit includes a first capacitor connected in series to the first backflow prevention diode and a second capacitor connected in series to the second backflow prevention diode between the opposite ends of the switching device circuit, a first connection that connects the first switching device to the second switching device and a second connection that connects the first capacitor to the second capacitor are connected to each other, and the first backflow prevention diode has a withstand voltage equal to or more than a withstand voltage of the first capacitor while the second backflow prevention diode has a withstand voltage equal to or more than a withstand voltage of the second capacitor.

4. The boost chopper circuit according to claim 3, wherein each of the first backflow prevention diode and the second backflow prevention diode is constructed of a wide band gap semiconductor.

5. The boost chopper circuit according to claim 1, further comprising a parallel switching device circuit connected in parallel to the backflow prevention diode circuit, wherein
the backflow prevention diode circuit and the parallel switching device circuit each have a withstand voltage equal to or more than the withstand voltage of the capacitor circuit.

6. The boost chopper circuit according to claim 5, wherein
the switching device circuit includes a first switching device and a second switching device connected in series to the first switching device, the backflow prevention diode circuit includes a first backflow prevention diode connected in series to the first switching device and a second backflow prevention diode connected in series to the second switching device, the capacitor circuit includes a first capacitor connected in series to the first backflow prevention diode and a second capacitor connected in series to the second backflow prevention diode between the opposite ends of the switching device circuit, a first connection that connects the first switching device to the second switching device and a second connection that connects the first capacitor to the second capacitor are connected to each other, the parallel switching device circuit includes a first parallel switching device connected in parallel to the first backflow prevention diode and a second parallel switching device connected in parallel to the second backflow prevention diode, and the first backflow prevention diode and the first parallel switching device each have a withstand voltage equal to or more than a withstand voltage of the first capacitor while the second backflow prevention diode and the second parallel switching device each have a withstand voltage equal to or more than a withstand voltage of the second capacitor.

7. A boost chopper circuit comprising:
a reactor;
a switching device circuit connected to opposite ends of a direct-current output circuit through the reactor;
a backflow prevention diode circuit connected in series to the switching device circuit; and
a capacitor circuit connected in series to the backflow prevention diode circuit between opposite ends of the switching device circuit, wherein
the backflow prevention diode circuit has a withstand voltage equal to or more than a withstand voltage of the capacitor circuit so that a failure of the backflow prevention diode circuit is prevented when a voltage substantially equal to a voltage applied to the capacitor circuit is applied to the backflow prevention diode circuit.

* * * * *